Aug. 26, 1952         A. POLLAK         2,608,537

LIGNIN REINFORCED RUBBER AND METHOD OF MAKING SAME

Filed July 12, 1947         3 Sheets-Sheet 1

INVENTOR
ARTHUR POLLAK
BY
Moses, Kolb, Crews & Berry
ATTORNEYS

Aug. 26, 1952 A. POLLAK 2,608,537
LIGNIN REINFORCED RUBBER AND METHOD OF MAKING SAME
Filed July 12, 1947 3 Sheets-Sheet 2

INVENTOR
ARTHUR POLLAK
BY
ATTORNEYS

Aug. 26, 1952  A. POLLAK  2,608,537
LIGNIN REINFORCED RUBBER AND METHOD OF MAKING SAME
Filed July 12, 1947  3 Sheets-Sheet 3
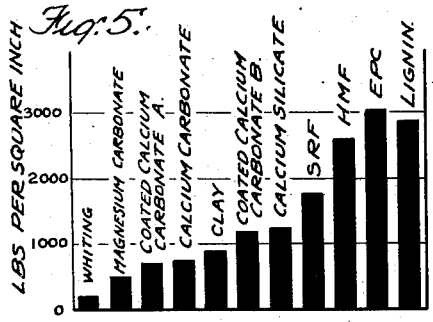
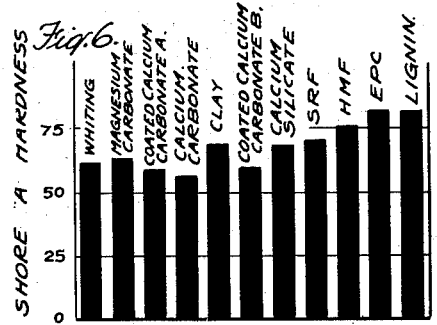
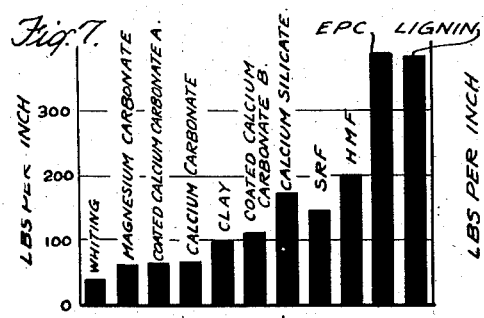
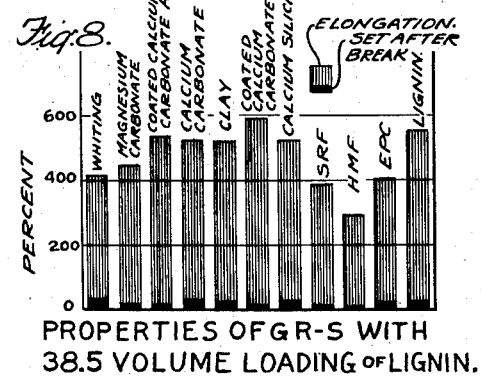
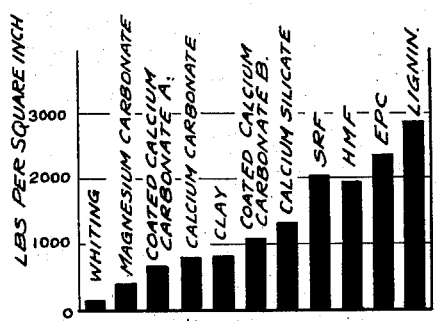
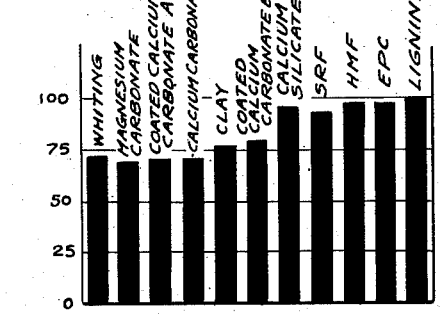
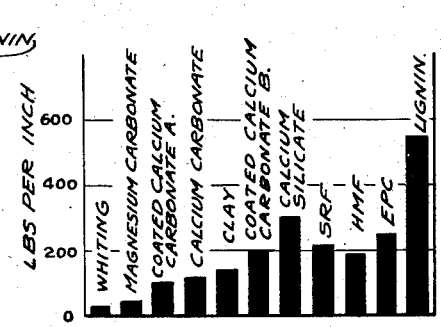
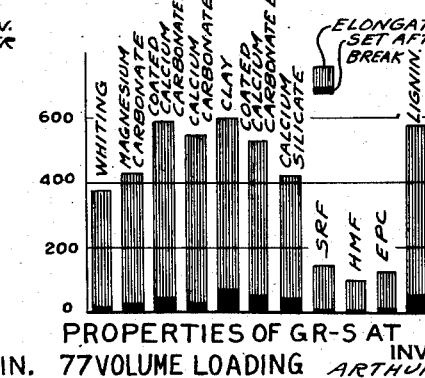
PROPERTIES OF GR-S WITH 38.5 VOLUME LOADING OF LIGNIN.
PROPERTIES OF GR-S AT 77 VOLUME LOADING OF LIGNIN.
INVENTOR
ARTHUR POLLAK
BY
Moses, Nolte, Crews Berry
ATTORNEYS Patented Aug. 26, 1952

2,608,537

UNITED STATES PATENT OFFICE 2,608,537

LIGNIN REINFORCED RUBBER AND METHOD OF MAKING SAME

Arthur Pollak, Charleston, S. C., assignor to West Virginia Pulp and Paper Company, New York, N. Y., a corporation of Delaware Application July 12, 1947, Serial No. 760,634

53 Claims. (Cl. 260—17.5)

The present invention relates to improvements in rubber compounding.

One principal reason for compounding rubber, either natural or synthetic, is to reduce its elasticity and increase its strength, such result being obtained when with the rubber is incorporated in homogeneous admixture fillers such as carbon black and, to a lesser degree, other finely divided pigments. The reason for the superiority of carbon black is considered to reside principally in the extreme degree of subdivision of its particles, the average particle size being in the range 0.01 to 0.10 micron (1 micron equals 1/1000 of a millimeter). Because of the superiority of carbon black as a reinforcing agent, strength must usually be sacrificed when a white or light colored stock is desired, since the white pigments, as for example zinc oxide, clay and the like, do not have as great a reinforcing action as carbon. As ordinarily practised, the incorporation of the carbon black or other substance, termed a reinforcing agent because of its beneficial action, is preceded by a mastication and softening of the rubber in an appropriate type of mill, e. g., a Banbury mixer, or a two-roll mill, this operation being termed a breakdown. When the breakdown has progressed to a certain point, plasticizers and softeners are added, followed, at the appropriate time with the addition of fillers, and then other chemicals such as accelerators, antioxidants, and vulcanizing agents, the milling being continued to disperse the compounding ingredients in the rubber.

In the attempt to secure a more perfect distribution of reinforcing agent and rubber, it has been proposed to coprecipitate the rubber from its dispersed or latex state with the filler which has previously been made into an aqueous suspension and mixed with the latex, the simultaneous precipitation of the two principal ingredients being brought about by the addition of an appropriate precipitating agent. The usual rubber chemicals are then milled into the dried precipitate or crumb.

Most rubber including natural rubber and the largest proportion of synthetic rubbers occurs as latex. The principal synthetic rubbers are the copolymer of butadiene and styrene (GR-S), the copolymer of butadiene and acrylonitrile (GR-A), and the polymer of chlorobutadiene (GR-M).

I have now discovered that by coprecipitating natural or synthetic rubber in the latex form with lignin as a reinforcing agent and filler, the resulting crumb when dried yields compounds having unique and valuable properties. Because of the high degree of dispersion of the lignin in the rubber, little milling time is needed for completing the breakdown. Generally it has been observed that where crude rubber required 20 minutes for breakdown, the lignin latex coprecipitate required only 2 to 4 minutes. In addition the time required for dispersing pigment, another 20 minutes, is also saved. In general the compounds so produced have tensile strengths and tear resistances which at lower loadings are comparable with those obtained using carbon blacks, while having properties not possessed by rubbers containing carbon blacks as the sole reinforcing agent, such as lightness of color, decreased specific gravity, increased elongation and decreased time of breakdown; at higher loadings the lignin reinforced compounds are characterized by higher tensile strengths and higher tear resistances than the corresponding carbon black reinforced compounds.

Among the rubber-reinforcing agents, the lignin referred to herein is unique in that it is soluble in aqueous alkali, such solutions being compatible with the latex emulsions in all proportions. Furthermore, it is possible to precipitate both the lignin and the rubber and other pigment from the mixture by use of acids in the same pH range as is commonly used in coagulating or precipitating latex alone, such precipitates containing the lignin so well dispersed in the rubber as to afford excellent reinforcing action upon compounding and curing.

In the drawing, Figures 1 and 2 show curves having a common horizontal axis designating volumes of lignin per 100 parts (by weight) GR-S, and indicating respectively tensile strength (Fig. 1) and elongation at break and set after break (Fig. 2) for GR-S reinforced with lignin in accordance with the present invention, and with three of the common carbon blacks, namely Easy Processing Channel Black (EPC), High Modulus Furnace Black (HMF) and Semi-Reinforcing Furnace Black (SRF). In Figure 2, the set after break is given for lignin only.

Figure 1:
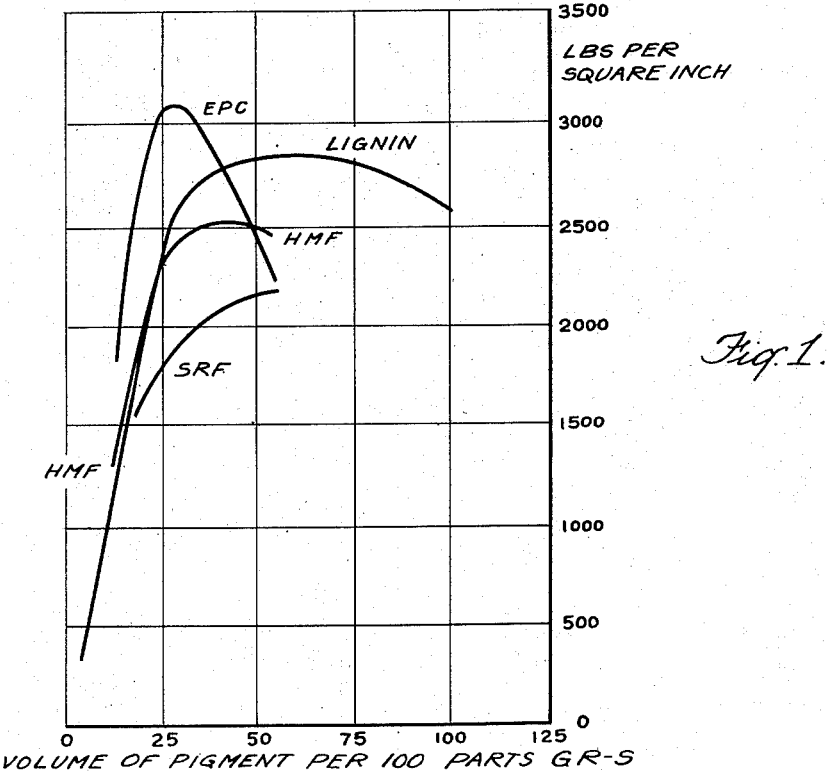

Figures 5, 6, 7 and 8 represent various properties of GR-S with 38.5 volume loading of lignin per 100 parts by weight GR-S in accordance with my invention, in comparison with other known fillers and reinforcing agents.

Figures 9, 10, 11 and 12 are respectively similar to Figures 5, 6, 7 and 8 except that 77 volumes loading of pigment per 100 parts by weight GR-S are used.

A further feature of my invention arises from my discovery that alkaline aqueous lignin solutions disperse carbon black and other pigments and that the resulting dispersions are compatible with latex emulsions. Thus, the so dispersed carbon black or pigment may be mixed with latex and the mixture then coprecipitated with a suitable precipitating agent, whereupon, the carbon black or pigment, the lignin, and the rubber are all precipitated together.

Prior to my discovery the dispersing agents available for carbon black presented serious problems. Thus some of them proved effective dispersants for the pigment but could not be inactivated during coprecipitation so that the coagulum proved difficult to filter and the washing losses of either rubber or pigment or both were very serious. Other dispersing agents proved incompatible with the latex so that coagulation set in before adequate mixing was attained. Most of the dispersing agents were also objectionable because their residues in the coprecipitates exercised a deleterious effect on the resulting rubber.

These various objections, however, are overcome by the use of lignin in that it coprecipitates with the pigment from compatible dispersions and is inactivated and converted to a reinforcing agent. The carbon black may be dispersed in water by first mixing lignin and carbon black in their dry states and then adding alkali solutions to the mixture; or, an alkaline lignin solution may be stirred into a slurry of carbon black. Another procedure is to mix the dry carbon into an alkaline lignin solution. In either event, the resulting dispersions may be diluted with water as desired. The amount of lignin used beyond the quantity needed as a dispersing agent will depend on the proportions of lignin desired in the rubber. Since the lignin coprecipitates with the rubber, the use of relatively large amounts thereof does not increase the loss of carbon or rubber during the washing, as is the case with other wetting or dispersing agents. An example of dispersing carbon black in an aqueous alkaline lignin solution is as follows:

Mix 12.5 pounds of lignin
And 12.5 pounds of carbon black
Add 70 pounds of water
And then 5 pounds of 50% caustic soda.

The resulting 100 pounds of the mixture contains 12.5% lignin in the form of sodium lignate, and 12.5% of dispersed carbon black, or a total of 25% of reinforcing agents. An example of a lignin-titanium oxide dispersion follows:

Mix 20 pounds lignin
And 5 pounds titanium dioxide (TiO2)
Then add 67 pounds of water
Then add 8 pounds of 50% caustic soda.

A further example, involving calcium carbonate:

Mix 12.5 pounds lignin
And 12.5 pounds of finely divided precipitated calcium carbonate.
Add 70 pounds water, and then 5 pounds of 50% caustic soda.

A still further example in which the lignin to carbon ratio is low:

Mix 2.5 pounds of lignin and 74 pounds of water
Then add 1.0 pound of 50% caustic soda
And 22.5 pounds of carbon black.

In the use of coprecipitated lignin as a reinforcing agent for rubber, difficulty may be experienced in that a precipitate or crumb is obtained which is not easily filterable and washable. It is therefore a feature of my invention to carry out the coprecipitating step in a manner which overcomes this difficulty.

My invention will now be further illustrated by the following examples:

*Preparation of a rubber-lignin coprecipitate or "crumb"*

A solution of lignin was first made by preparing a slurry of 25 pounds thereof in 65 pounds of water and then adding 10 pounds of 50% caustic soda. The resulting 100 pounds of solution contained 25% lignin in the form of sodium lignate.

20 pounds of GR-S latex (copolymer of butadiene and styrene) containing anti-oxidants and short stop agents having a rubber content of 5 pounds was mixed with 10 pounds of the 25% lignin solution.

An 0.8% sulfuric acid solution was prepared by adding 1.8 pounds of 60° Bé. (77.7%) sulfuric acid to 178 pounds of water. This solution was heated to 194° F. and the lignin-latex mixture slowly added thereto while agitating thoroughly. The mixture, now containing a coprecipitate of 50 parts lignin to 100 parts rubber, was then filtered, in this instance using a lead filter press fitted with 12" by 12" by 1" frames. The cake was washed in the press with 800 pounds of water. Vacuum filters were also found satisfactory in other experiments. The washed cake or crumb was then dried in an air oven at a temperature of 160° F. By so proceeding an easily filterable coprecipitate was obtained.

*Compounding the coprecipitate*

The lignin-GR-S coprecipitates of various loadings similarly prepared were compounded by the following formula, parts by weight:

GR-S _____ 100
Lignin _____ Variable
Zinc oxide_____ 5
Benzothiazyl disulfide_____ 1.5
Copper diethyldithiocarbamate_ 0.6/100 lignin
Plasticizer (a pine resin, e. g. "Butac"[1] _____ 5
Sulfur _____ 2

[1] A commercial product which s rosn softened with turpentine.

Specimens of such loadings, cured at 292° F. tested as follows:

| Lignin Loading lbs./100 lbs. GR-S | Tensile Strength lbs./sq. in. | Tear Resistance lbs./in. |
|---|---|---|
| 10 | 760 | ---------- |
| 25 | 1,170 | 240 |
| 50 | 2,770 | 450 |
| 70 | 2,740 | 450 |
| 100 | 2,750 | 510 |
| 125 | 2,640 | 600 |

The above recipe and others that follow are, so far as the ingredients other than lignin are concerned, patterned after typical GR-S recipes and have given a satisfactory product with the customary processing equipment. Other recipes could be devised by those skilled in the art which would be equally satisfactory.

Other results are given in the form of the curves of Figs. 1, 2, 3 and 3A in which the relationships of tensile strength, elongation at break, tear resistance and hardness are all plotted against volume loadings of GR-S of both lignin and three of the common carbon blacks. The carbon black data given in Fig. 1 are taken from Bulletin No. 3 of Godfrey L. Cabot, Inc. In Fig. 1 it will be noted that up to about 37 volumes loading, the tensile strength for lignin reinforced GR-S is somewhere between that for Easy Processing Channel Black and High Modulus Furnace Black. However, at higher loadings, e. g. up to 100 volumes, the value for lignin reinforced GR-S is substantially greater than for the carbon blacks and the value for 100 volumes lignin loading is approximately that for 25 volumes lignin loading. The tear resistance (Fig. 3) is given in respect of ASTM Die B and the curves for tear resistances are essentially similar to those for tensile strength. The Shore "A" hardness of the lignin compounds is somewhat higher though of substantially the same magnitude.

(In the rubber trade it is common to refer to reinforcing agents in terms of volume. For example, carbon black having a specific gravity of 1.8 has a specific volume of 0.56. Lignin, having a specific gravity of 1.3 has a specific volume of 0.77. On the other hand it is customary to refer to the rubber component by parts by weight.)

In Figs. 5 to 12 are shown the properties of lignin loaded GR-S as compared with loadings with other pigments, Figs. 5 to 8, inclusive, referring to 38.5 volume loadings whereas Figs. 9 to 12 refer to 77 volumes loading, i. e., "volumes" of pigment to 100 parts by weight of GR-S. It will be seen from these figures that at the higher loadings the lignin has greater tensile strength than the other pigments tested, has slightly greater Shore hardness than the carbon blacks and the calcium silicate, has substantially greater crescent tear resistance than the other pigments, has greater elongation than the carbon blacks taken with a comparatively low set at break. The differences at 38.5 volumes while similar in most instances are not as marked.

Figure 4:
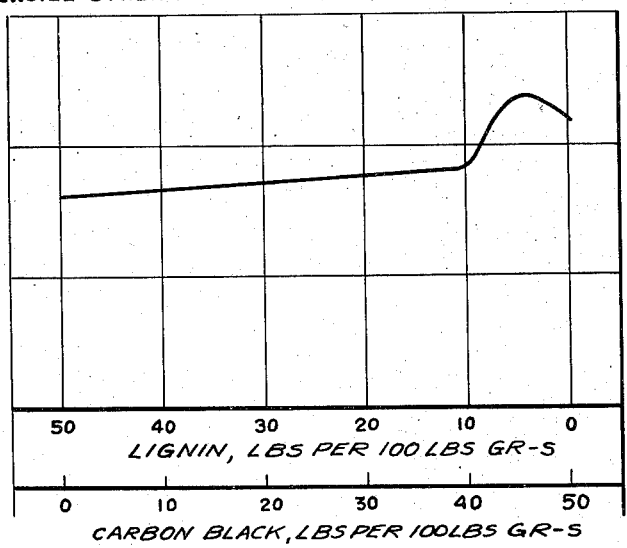
Figure 4 is a curve showing tensile strength of GR-S-lignin-carbon black mixtures.

Lignin is compatible with other rubber reinforcing agents, particularly carbon black, and in Fig. 4 the curve of tensile strength is plotted for mixtures of from 0 parts lignin to 50 parts carbon black, to 50 parts of lignin and 0 parts carbon black, the total loading (by weight) always being 50 pounds, this loading being chosen because in general it is recognized that maximum tensile strengths occur around such value. It will be noted that in the region of 5 parts lignin, 45 parts carbon black, the curve reaches a maximum and has a higher tensile value than with no lignin at all. From 10 parts lignin, 40 parts carbon black to 50 parts lignin and no carbon black, the curve slopes slightly downward. The data given in Fig. 4 were obtained by coprecipitating the carbon black and lignin but comparable results are obtained by first coprecipitating the rubber and the lignin and then incorporating the carbon black by dry milling. However, in the case of some carbon blacks, particularly medium processing channel black and high processing channel black, the milling operation is attended with some difficulty so that coprecipitation of both reinforcing agents and the rubber is of substantial advantage. If desired, however, the lignin may be coprecipitated with the rubber at high loading, the product being termed a master batch and then the rubber, as for example GR-S, added by dry milling to bring the proportion of the lignin to that desired in the final mixture and then the carbon black added by dry milling. This method likewise gives substantially the same results as given in Fig. 4. Referring to Fig. 4 the following compounding recipe was used, the parts by weight:

| | |
|---|---|
| GR-S | 100 |
| Lignin | } 50 |
| Carbon Black (EPC) | |
| Zinc oxide | 5 |
| Benzothiazyl disulfide | 1.5 |
| Copper diethyldithiocarbamate | 0.6/100 lignin |
| Plasticizer | 8 |
| Sulfur | 2 |

Rubbers other than those originally occurring as latices, e. g. Butyl, reclaimed rubber, etc. may also be dry milled into the rubber-lignin coprecipitate. The compatibility of lignin with carbon black as a reinforcing agent has been brought out in the foregoing. This compatibility extends to other fillers, with the result that the reinforcing action of lignin is an additive one. This action is shown in the following data:

TENSILE STRENGTH, P. S. I.

| Pigment | Vols. | No Lignin | Half Lignin | All Lignin |
|---|---|---|---|---|
| Coated Calcium Carbonate A | 38.5 | 670 | 1,490 | 2,890 |
| | 77 | 790 | 1,410 | 2,850 |
| Clay | 38.5 | 900 | 1,840 | 2,890 |
| | 77 | 810 | 1,720 | 2,850 |
| Calcium Silicate | 38.5 | 1,260 | 1,670 | 2,890 |
| | 77 | 1,330 | 1,660 | 2,850 |

TEAR RESISTANCE, LBS./IN.

| Pigment | Vols. | No Lignin | Half Lignin | All Lignin |
|---|---|---|---|---|
| Coated Calcium Carbonate A | 38.5 | 70 | 170 | 380 |
| | 77 | 120 | 250 | 550 |
| Clay | 38.5 | 100 | 180 | 380 |
| | 77 | 150 | 320 | 550 |
| Calcium Silicate | 38.5 | 170 | 170 | 380 |
| | 77 | 300 | 340 | 550 |

A further advantage arises from the fact that lignin has a lower density than carbon black, i. e., 1.3 as compared with 1.8–1.9 for carbon blacks. In comparison with other fillers such as clay and calcium carbonate (specific gravity 2.6), titanium oxide (sp./g. 3.9), zinc oxide (sp./g. 5.6), appreciable savings in weight may be had by the use of lignin. In many applications this is a highly important consideration. For example, in a rubber tire tread stock using lignin a saving of 7% in weight results for a formula normally using 50 parts carbon black per 100 parts rubber.

Lignin has a much lower pigmenting power than carbon black, so that with its use it is possible to produce brightly colored rubber products of high strength and of lower weight using relatively small amounts of white or colored pigments of dyes.

Where it is not desired to carry out the coprecipitation of lignin with latex in a given rubber compounding plant, a master batch of lignin-loaded rubber obtained by coprecipitation, as above mentioned, may be supplied the compounder, who thereupon breaks it down and completes the compounding with additional rubber and carbon or such other mix as may be desired.

The foregoing examples involve GR-S. The following is an example of coprecipitating and compounding natural rubber with lignin:

| | Parts |
|---|---|
| Natural rubber latex containing 38.5 solids to give 100 parts rubber. | |
| Lignin as sodium lignate to give 50 parts lignin. | |
| Zinc oxide | 5 |
| Mercaptobenzothiazole | 1.5 |
| Tetramethylthiuram monosulfide | 0.4 |
| Stearic acid | 1.0 |
| Antioxidant | 0.5 |
| Sulfur | 2.5 |

A sample of this compound cured for five minutes at 292° F. gave results as follows:

| | |
|---|---|
| Tensile strength, p. s. i | 3980 |
| Modulus at 300% elongation, p. s. i | 600 |
| Elongation at break, percent | 740 |
| Tear resistance, lbs./in | 770 |
| Shore "A" hardness | 73 |

The following is a similar example of compounding and coprecipitating nitrile rubber (GR-A) with lignin:

| | Parts |
|---|---|
| Nitrile rubber latex containing 26 mol percent acrylonitrile to give 100 parts rubber. | |
| Lignin as sodium lignate to give 50 parts lignin. | |
| Zinc oxide | 5 |
| Benzothiazyl disulfide | 0.7 |
| Tetramethylthiuram monosulfide | 0.1 |
| Antioxidant | 1 |
| Dibutyl phthalate | 10 |
| Sulfur | 2 |

A sample of this compound cured for 60 minutes at 292° F. gave the following tests:

| | |
|---|---|
| Tensile strength, p. s. i | 3100 |
| Modulus at 300% elongation, p. s. i | 630 |
| Elongation at break, percent | 660 |
| Tear resistance, lbs./in | 160 |
| Shore "A" hardness | 74 |

In both of the examples last given the rubber was coprecipitated with the lignin in the same manner as in the case of the GR-S lignin coprecipitates previously given.

As expected the tensile strength and tear resistance of natural rubber is somewhat higher than in the case of GR-S for the same loadings (38.5 volume loading of lignin being the same as 50 parts by weight). The use of lignin, with other synthetic rubbers, as for example neoprene (GR-M) is also advantageous.

When the so-called wet crumb, i. e., the filter cake from the operation of filtering the lignin rubber coprecipitate, is milled in known devices (Plasticator, Colloid Mill, Banbury mixer or roller mill) the lignin is caused to undergo an even further subdivision in particle size due to the shearing action which takes place in the gelled lignin particles. If desired, advantage may be taken of this shearing action by adding gelled lignin to the mixture during the milling operation. Lignin in the gelled state is available (1) from the lignin prepared from black liquor prior to drying, (2) by soaking or grinding dried lignin with sufficient alkaline solution or other solvent, i. e., dioxane, ethylene glycol, etc., to give a paste, or (3) the lignin may be mixed with a sufficient quantity of fugitive alkali such as ammonia or morpholine, or a polymerizable chemical such as aniline or aniline-furfural mixture, with sufficient agitation or trituration, or with other agents, as for example reactable chemicals (toluidine, cresol). Rubber plasticizers, e. g. diethylene glycol, coal tar bases, capable of gelling with lignin may also be employed for this purpose and a lignin gel formed in the same way, i. e., trituration, agitation, etc. However formed, the lignin gel as such, or mixed with other pigment or plasticizer may be milled with the rubber along with other agents, e. g., other reinforcing agents, pigments, accelerators, curing agents, etc. In this manner the lignin or lignin-pigment mixture is dispersed in the rubber and the lignin subdivided into particle size to give a reinforcing effect comparable with that obtained by coprecipitation with the rubber. Such action, however, is to be distinguished from the use of dried precipitated lignin which is generally of large particle size, about one to five microns, and does not give reinforcing action which is comparable with either carbon black or coprecipitated lignin. When polymerizable or reactable chemicals have been used to gel the lignin, they will, under curing, polymerize or react and to some extent serve as a reinforcing agent and filler for the rubber. In the case of a volatilizable alkali, e. g., morpholine, this will be volatilized during the curing and to some extent during the milling.

Since the lignin is slightly acidic in nature, its presence retards somewhat the cure where the usual alkaline accelerator chemicals such as diphenyl guanidine or mercaptobenzothiazole are used. This may be readily overcome by the use of more or stronger accelerator chemicals, such as copper diethyldithiocarbamate or tetramethylthiuram monosulfide, or by increasing the amount of a base present, as by increasing the quantity of the zinc oxide. Or, the acidity may be reduced by adding alkalis, alkaline substances such as amines, or compounds of groups I, II, and III metals such as lime which form salts with lignin. These may be added either while milling or preferably to the wet coprecipitate of lignin and rubber.

Advantages may be otherwise taken of the property of lignin of being soluble in and gelling in alkaline solutions in order to form a dispersion of it with rubber latex. For example, the lignin may be added to the latex as a wet slurry and a thorough mixture obtained by agitation. Where, as is usual, the pH of the latex is on the alkaline side, the lignin, which has an acid reaction, will dissolve and cause a drop of the pH to a point where the rubber and lignin will precipitate. Furthermore, such of the lignin, if any, as does not precipitate will be gelled under these conditions and in this form will be readily subdivisible and dispersible in the milling operation, as has already been pointed out. If necessary the pH of the mixture may be adjusted to the desired point to completely precipitate the rubber or the rubber and lignin mixture. Even dry lignin when mixed with latex under these conditions will similarly become either dissolved or gelled. Other alkalis than the alkali metal hydroxides may be used to solubilize the lignin, as for example ammonia, triethanolamine, diethanolamine, etc.

While acids are commonly used for forming the lignin-latex coprecipitate, their coprecipitation can be induced by other means. Thus, a fugitive alkali such as ammonia, morpholine or polymerizable amines, e. g., aniline, may be used to solubilize the lignin; and then, after addition of the solution to the latex, coprecipitation may be induced by heating. This effect may also be aided by the addition of electrolytes. Coprecipitation may also be induced by either freezing or evaporation.

Additionally, the electrolytic decomposition of latex-lignin dispersions or solutions is likewise practical.

Lignin is generally identified as that component of wood which is insoluble in 72% $H_2SO_4$; it is a compound of carbon, hydrogen and oxygen, and sometimes of the foregoing plus sulfur, and is further characterized by being soluble in solvents such as dioxane and by having sufficient acidity so that it will combine with sodium or nitrogen alkalis, and form water soluble compounds which can be precipitated by adding acids. In sulfite cooking the lignin of the wood is rendered soluble by the action of the wood with cooking liquors. These extracts of the wood either as such or partly purified are sometimes mistakenly termed "lignin" but are actually lignin sulfonates. It is possible to treat lignin sulfonates with alkali to convert them to a form which is insoluble in water but soluble in alkaline solution, the same as sulfate or soda lignin. When so treated, such sulfite lignin would come within the purview of my invention.

The lignin used in the foregoing examples was obtained by first concentrating the black liquor from the sulfate cooking of pine wood, removing tall oil skimmings, lowering the pH of the liquor by treatment with carbon dioxide gas, and coagulating the lignin by heat and purifying by acid washing. The lignin so made is a dry powder having the following range of analysis:

| | | |
|---|---|---|
| Moisture | percent | 4 |
| Ash | do | Less than 0.5 |
| Sulfur | do | 1-2 |
| Methoxyl | do | 13.5-14.5 |
| Dioxane insolubles | do | Less than 1 |

A still further source of lignin suitable for the purpose of the present application is the saccharification of the wood and other ligneous vegetable matter, e. g., the Scholler process and its modifications, which produces an insoluble ligneous residue which is highly acidic, containing some sugars, hemicelluloses and other degradation products of cellulose. This material is susceptible to purification to yield a material suitable for coprecipitation with rubber.

Figure 2:
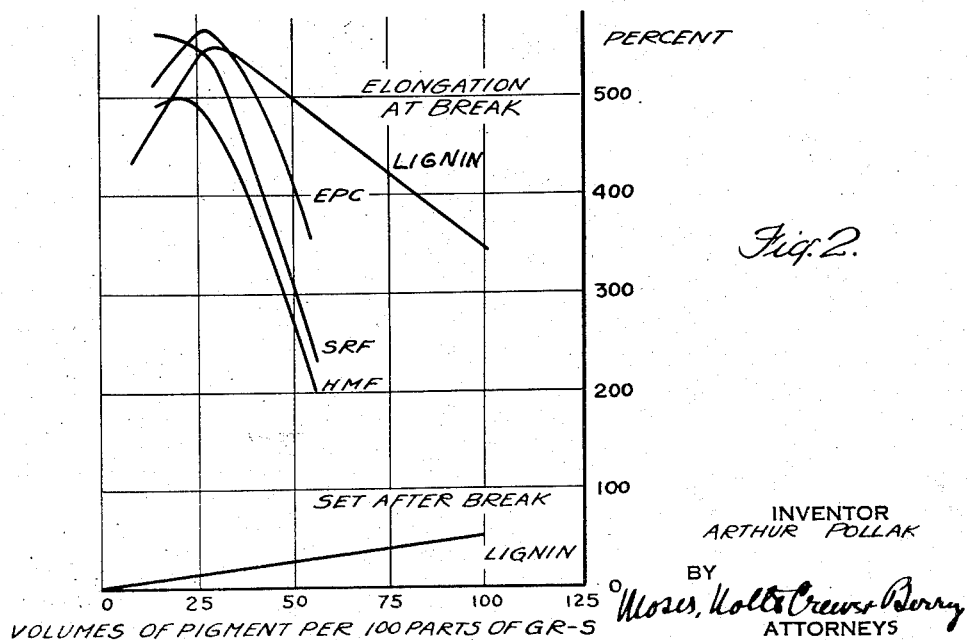
Figure 3:
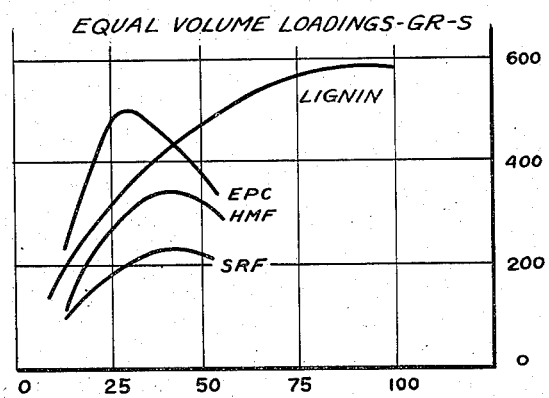
Figure 3 shows similar curves in which the tear resistance of lignin reinforced GR-S is compared with that of carbon black reinforced GR-S of equal volume loadings.
Figure 3A:
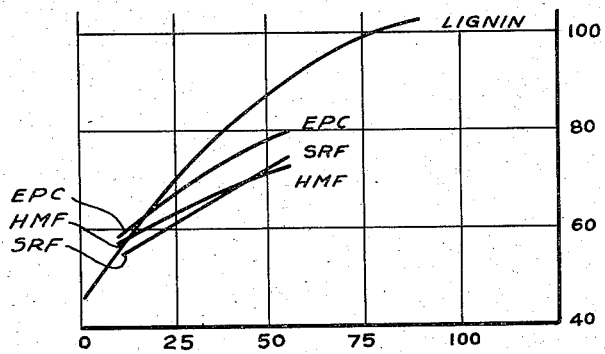
in Figure 3A are curves having the same horizontal axis as Figure 3 and in which Shore hardness of lignin reinforced GR-S and carbon black reinforced GR-S are compared for equal loadings.

The product of this application is termed an elastomer by which is meant a composition having the ability to stretch, upon the application of stress, from 200 to 300% or more of its original length, and after release of the stress to return to essentially its original length. The curves, particularly Figs. 2, 8 and 12, illustrate this property. In general, it will be seen that throughout the loading up to 100 volumes the elastomer produced conforms to this definition. It is recognized, however, that for most rubber uses known today, the optimum properties are not developed until quantities of reinforcing agent in excess of 10 volumes percent have been incorporated as can be seen from an examination of Figs. 1, 2, 3 and 3a.

In the claims it will be understood that rubber is intended to include both natural and synthetic rubber originally occurring as an aqueous alkaline emulsion unless the contrary is indicated.

This application is a continuation in part of application Serial No. 603,748 filed July 7, 1945.

I claim:

1. The method of making an elastomer, which comprises adding lignin to alkaline latex of a polymeric butadiene rubber thereby causing the coagulation of the rubber in the latex and the entrapment of the rubber in lignin gel, recovering the rubber and lignin gel, masticating and softening and effecting breakdown of the rubber and causing the subdivision of the lignin gel and the dispersion thereof in the rubber.

2. The method of producing coagulum of butadiene-1,3-styrene copolymer synthetic rubber which comprises mixing aqueous sodium lignate with latex of the rubber and then simultaneously coagulating the rubber and precipitating lignin from the solution to produce coagulum of the rubber in which the precipitated lignin is substantially uniformly dispersed.

3. The product produced by the method of claim 2.

4. The method of making a reinforced elastomer which comprises mixing aqueous alkali lignate and a latex of a polymeric butadiene rubber, coprecipitating the rubber and lignin to produce a coagulum containing the rubber and lignin, drying the coagulum, masticating and softening and effecting breakdown of the same thereby forming a reinforced elastomer having the lignin substantially uniformly dispersed therethrough, the lignin serving as a reinforcing agent.

5. The product produced by the method of claim 4.

6. The method of claim 4 in which the rubber is natural rubber.

7. The product produced by the method of claim 6.

8. The method of claim 4 in which the rubber is butadiene 1,3-styrene copolymer.

9. The product of the method of claim 8.

10. The method of claim 4 in which the rubber is butadiene 1,3-acrylonitrile copolymer.

11. The product of the method of claim 10.

12. The method of claim 4 in which the rubber is chlorobutadiene polymer.

13. The product of the method of claim 12.

14. The method of making a reinforced elastomer which comprises preparing a substantially homogeneous mixture of lignin and a latex of a polymeric butadiene rubber, coprecipitating the rubber and lignin to produce a coagulum containing the rubber and lignin, drying the coagulum, masticating and softening and effecting breakdown of the same thereby forming a reinforced elastomer having the lignin substantially uniformly dispersed therethrough, the lignin serving as a reinforcing agent.

15. The reinforced elastomer produced by the method of claim 14.

16. The method of claim 14 in which the rubber is natural rubber.

17. The reinforced elastomer produced by the method of claim 16.

18. The method of claim 14 in which the rubber is butadiene 1,3-styrene copolymer.

19. The reinforced elastomer produced by the method of claim 18.

20. The method of claim 14 in which the rubber is butadiene 1,3-acrylonitrile copolymer.

21. The reinforced elastomer produced by the method of claim 20.

22. The method of claim 14 in which the rubber is chlorobutadiene polymer.

23. The reinforced elastomer produced by the method of claim 22.

24. The method of making a reinforced elastomer which comprises preparing a substantially homogeneous mixture of lignin and a latex of a polymeric butadiene rubber, coprecipitating the rubber and lignin to produce a coagulum containing the rubber and lignin, drying the coagulum, masticating and softening and effecting breakdown of the same thereby forming a reinforced elastomer having the lignin substantially uniformly dispersed therethrough, the lignin serving as a reinforcing agent, the parts of lignin based on one hundred parts of polymer being from in excess of one to approximately one hundred.

25. A reinforced elastomer produced by the method of claim 24.

26. The reinforced elastomer produced by the method of claim 24 in which the rubber is a copolymer of butadiene and styrene.

27. The reinforced elastomer produced by the method of claim 24 in which the rubber is butadiene-acrylonitrile copolymer.

28. The reinforced elastomer produced by the method of claim 24 in which the rubber is chlorobutadiene polymer.

29. The reinforced elastomer produced by the method of claim 24 in which the rubber is natural rubber.

30. The method of claim 24 in which the rubber is a copolymer of butadiene and styrene.

31. The method of claim 24 in which the rubber is butadiene-acrylonitrile copolymer.

32. The method of claim 24 in which the rubber is chlorobutadiene polymer.

33. The method of claim 24 in which the rubber is natural rubber.

34. The method of making an elastomer, which comprises first forming a suspension of rubber reinforcing pigment in a solution of lignin, mixing said suspension with a polymeric butadiene rubber latex, coprecipitating the rubber, pigment and lignin from said suspension to form a crumb, and homogenizing the crumb with additional lignin in the gelled state, together with a curing agent.

35. A product of the method of claim 34.

36. The method of claim 34 in which the rubber is natural rubber.

37. The product of the method of claim 36.

38. The method of claim 34 in which the rubber is butadiene-1,3-styrene.

39. The product of the method of claim 38.

40. The method of claim 34 in which the rubber is butadiene-1,3-acrylonitrile.

41. The product of the method of claim 40.

42. The method of claim 34 in which the rubber is chlorobutadiene.

43. The product of the method of claim 42.

44. The method of making a reinforced elastomer which comprises milling a gel of lignin with polymeric butadiene rubber.

45. The product of the method of claim 44.

46. The method of claim 44 in which the polymer is natural rubber.

47. The product of the method of claim 46.

48. The method of claim 44 in which the polymer is butadiene-1,3-styrene polymer is butadiene-1,3-styrene copolymer.

49. The product of the method of claim 48.

50. The method of claim 44 in which the polymer is butadiene-1,3-acrylonitrile.

51. The product of the method of claim 50.

52. The method of claim 44 in which the polymer is chlorobutadiene.

53. The product of the method of claim 52.

ARTHUR POLLAK.

REFERENCES CITED

The following references are of record in the file of this patent:

UNITED STATES PATENTS

| Number | Name | Date |
|---|---|---|
| 1,833,029 | Mac Kay | Nov. 24, 1931 |
| 2,195,380 | Patrick | Mar. 26, 1940 |
| 2,343,368 | Daly | Mar. 7, 1944 |
| 2,353,568 | King | July 11, 1944 |
| 2,355,180 | De Remy | Aug. 8, 1944 |
| 2,381,248 | Bascom | Aug. 7, 1945 |

OTHER REFERENCES

Indulin For Reinforcing Rubber, published 1946 by Industrial Chemical Sales Division, West Va. Pulp and Paper Co., 31 pages.